United States Patent
Rivers et al.

(10) Patent No.: US 6,708,703 B1
(45) Date of Patent: Mar. 23, 2004

(54) PORTABLE UMBRELLA POLE DOOR CLIP

(76) Inventors: Paul Brent Rivers, 1886 County Rd. 255, Cullman, AL (US) 35057; Frederick James Diggle, 2054-H Vestavia Park Ct., Birmingham, AL (US) 35216

( * ) Notice: Subject to any disclaimer, the term of this patent is extended or adjusted under 35 U.S.C. 154(b) by 0 days.

(21) Appl. No.: 10/260,154

(22) Filed: Sep. 30, 2002

(51) Int. Cl.[7] .............................................. A47G 25/12
(52) U.S. Cl. ........................ 135/16; 248/214; 248/534
(58) Field of Search ........................... 135/16; 248/314, 248/315, 511, 534, 229.16, 214; 312/237, 280, 223.1; 108/48, 49

(56) References Cited

U.S. PATENT DOCUMENTS

| | | | | |
|---|---|---|---|---|
| 200,945 A | * | 3/1878 | Smith | 135/21 |
| 276,791 A | * | 5/1883 | Engle | 248/515 |
| 281,832 A | * | 7/1883 | Bryan | 248/339 |
| 300,832 A | * | 6/1884 | Ball | 248/113 |
| 835,314 A | * | 11/1906 | Oliver | 248/214 |
| 2,961,693 A | * | 11/1960 | Frehm | 16/87.4 R |
| 3,606,445 A | * | 9/1971 | Wunderlich | 296/168 |
| 4,410,158 A | * | 10/1983 | Maffei | 248/214 |
| 4,606,523 A | | 8/1986 | Statz et al. | |
| 4,784,360 A | | 11/1988 | Mok | |
| 4,834,129 A | | 5/1989 | Pinsonneault | |
| 4,880,133 A | | 11/1989 | Cullinane | |
| 5,431,364 A | | 7/1995 | Etter | |
| 6,079,679 A | * | 6/2000 | Mitchell | 248/229.16 |
| 6,199,819 B1 | * | 3/2001 | Churillo | 248/540 |
| 6,219,258 B1 | | 4/2001 | Denzene et al. | |

OTHER PUBLICATIONS

Universal Series Cross–Connect Cabinets, ©2000, www.marconi.com/osp, Marconi Communications Inc., 4350 Weaver Parkway, Warrenville, IL 60555.

* cited by examiner

*Primary Examiner*—Janet M. Wilkens
(74) *Attorney, Agent, or Firm*—Bambi Walters; Scott Zimmerman (57) ABSTRACT

Apparatus and methods provide an umbrella holder that is securable to a telecommunications cabinet or to an electrical cabinet. The umbrella holder provides greater environmental protection of the cabinet and of the hardware and equipment contained within the cabinet and increases access to the work area surrounding the cabinet. The umbrella holder can engage a top portion of an open cabinet door for support to position the umbrella, or, alternatively, it can wedge under a top edge of the cabinet to frictionally retain the umbrella in position when an umbrella pole is secured in the umbrella holder.

21 Claims, 10 Drawing Sheets

PORTABLE UMBRELLA POLE DOOR CLIP

CROSS-REFERENCE TO RELATED APPLICATIONS

This application relates to applicants' co-pending application, entitled "CROSS BOX SIDE MOUNT UMBRELLA BRACKET," Ser. No. 10/256,500 filed Sep. 27, 2002, and of which the "Brief Summary of the Invention" and the "Detailed Description of the Invention" sections are incorporated herein by reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention relates generally to the field of telecommunications, and, in particular, to a side-mounted, umbrella holder bracket for telecommunication cabinets.

2. Description of the Related Art

In the telecommunications or electronics industry, it is common practice to locate free-standing hardware and equipment outdoors. Typically, this hardware and equipment includes a surrounding cabinet to protect from ambient weather and other environmental conditions. As used herein, the term "cabinet" includes terminals, closures, enclosures, housings, and other devices used to protect outdoor telecommunications and/or electrical hardware and equipment. Cabinets may be polygon or non-polygonally shaped and constructed of any appropriate material, such as, for example, metal, polymer, plastic, ceramic, glass, crystal, and/or combinations thereof.

Occasionally, it is necessary for technicians to service this hardware and equipment. When service is required during adverse weather conditions, the hardware and equipment needs protection while the cabinet doors are open. Typically, the technician and the hardware and equipment are protected by a large umbrella which is held or otherwise supported by the technician over an open cabinet. The umbrella also protects a work area in front of the open cabinet. However, it is during such adverse weather conditions that positioning of the umbrella over the cabinet is a most difficult procedure to follow. For instance, such umbrellas are usually employed during windy and rainy conditions that make their controlled maneuverability by a single person (e.g., the technician) very difficult, tiring and time-consuming. Further, the technician does not have a great deal of room to work under the umbrella and frequently must use one hand to assist in securing the position of the umbrella, thus making it more difficult for the technician to gain access to the hardware and equipment.

SUMMARY OF THE INVENTION

This invention addresses the above-described and other needs by providing a portable umbrella holder that is securable to a telecommunications cabinet or to an electrical cabinet. The umbrella holder provides greater environmental protection of the cabinet and of the hardware and equipment contained within the cabinet and increases access of the surrounding work area. Further, the umbrella holder is multi-functional in that it can engage a top portion of an open cabinet door for support to position the umbrella, and, alternatively, it can wedge under a top edge of the cabinet to frictionally retain the umbrella in position when an umbrella pole is secured in the umbrella holder.

In an embodiment, this invention includes an umbrella holder for a telecommunications cabinet that has a hollow, upwardly extending open passageway having at least one generally cylindrical side portion, a substantially planar base portion, a top, and a bottom; a hook having a shank extending upwardly with the substantially planar base portion, the hook further having a handle portion with a backing plate extending downwardly from the handle portion; and a arm extending upwardly from the handle portion. The passageway comprises an aperture (e.g., an opening) for receiving a first end of a generally cylindrical section of an umbrella pole. Typically, the umbrella holder is secured to an umbrella pole of an umbrella that the technician carries with him to each job site. The umbrella pole is placed or secured in the aperture of the umbrella holder, thus, making the umbrella holder portable with the umbrella. When a technician arrives at a job site, he/she can then position the umbrella holder over a top portion of an open telecommunications cabinet door or can wedge it under a top edge of the telecommunications cabinet. Once the umbrella holder is set in a desired position over the work area, the umbrella portion can be opened to provide protection from precipitation and sun and allow the technician to work hands free.

In another embodiment, the umbrella holder further includes a companion apparatus, a support bracket, for additional support of the umbrella. The support bracket has a second hollow, upwardly extending open passageway having a second generally cylindrical side portion, a substantially planar bracket base portion, a second top, and a second bottom wherein the second passageway defines a second aperture for positioning the first end of the generally cylindrical section of the umbrella pole. The support bracket includes means for mounting the substantially planar bracket base portion to a side wall of the telecommunications cabinet, such as, for example a pair of substantially planar arms extending outwardly from the base portion that may be secured to the cabinet with nuts, bolts, screws, rivets, welding, and other means known in the art.

In another embodiment, this invention includes the telecommunications cabinet having a plurality of side walls, a top, and at least one door providing access to an interior of the cabinet, the umbrella holder and/or the support bracket described in the above embodiments. The interior of the cabinet houses hardware and equipment for sending and receiving telecommunications signals or electrical hardware and equipment.

Finally, this invention includes a method of supporting an umbrella that includes positioning the above-described umbrella holder with the umbrella to a telecommunications cabinet. The method may further include positioning a generally cylindrical section of an umbrella pole into the above-described support bracket attached to a lower portion of a door of the telecommunications cabinet. The umbrella holder is positioned either by engaging the hook over a top portion of the door or by securing the umbrella pole within the passageway and wedging the arm under a top edge of the telecommunications cabinet, such that the umbrella holder frictionally retains the umbrella holder with the umbrella in a desired position.

BRIEF DESCRIPTION OF THE DRAWINGS

The above and other embodiments, objects, uses, advantages, and novel features of this invention are more clearly understood by reference to the following description taken in connection with the accompanying figures, in which.

DETAILED DESCRIPTION OF THE INVENTION

This invention now will be described more fully hereinafter with reference to the accompanying drawings, in which exemplary embodiments are shown. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Thus, for example, it will be appreciated by those skilled in the art that the schematics and the like represent conceptual views of illustrative structures embodying this invention.

In the claims hereof any element expressed as a means for performing a specified function is intended to encompass any way of performing that function including, for example, a combination of elements that performs that function. The invention as defined by such claims resides in the fact that the functionalities provided by the various recited means are combined and brought together in the manner that the claims call for. Applicant thus regards any means that can provide those functionalities as equivalent as those shown herein.

This invention is directed to portable umbrella holder that is securable to a telecommunications cabinet or to an electrical cabinet. The umbrella holder provides greater environmental protection for the cabinet and for the hardware and equipment contained within the cabinet. The umbrella holder also increases access to the work area surrounding the cabinet. The umbrella holder can engage a top portion of an open cabinet door for support to position the umbrella, or, alternatively, the umbrella holder can wedge under a top edge of the cabinet to frictionally retain an umbrella pole secured in the umbrella holder. Further, this invention includes the resulting cabinet (i.e., the cabinet with the umbrella holder) and a method of using the umbrella holder to support an umbrella in a desired position.

As shown in FIGS. 1–7, the design of an umbrella holder 100 is based on a conventional design of a telecommunications cabinet 110. For example, the Universal Series Cross-Connect Cabinet manufactured by Marconi Communications (Marconi Communications, 4350 Weaver Parkway, Warrenville, Ill. 60555, 630-579-5000, is one example of an existing telecommunications cabinet that may use the umbrella holder 100. While a conventional cabinet design is shown, a variety of cabinets can easily use the umbrella holder 100.

Figure 1:
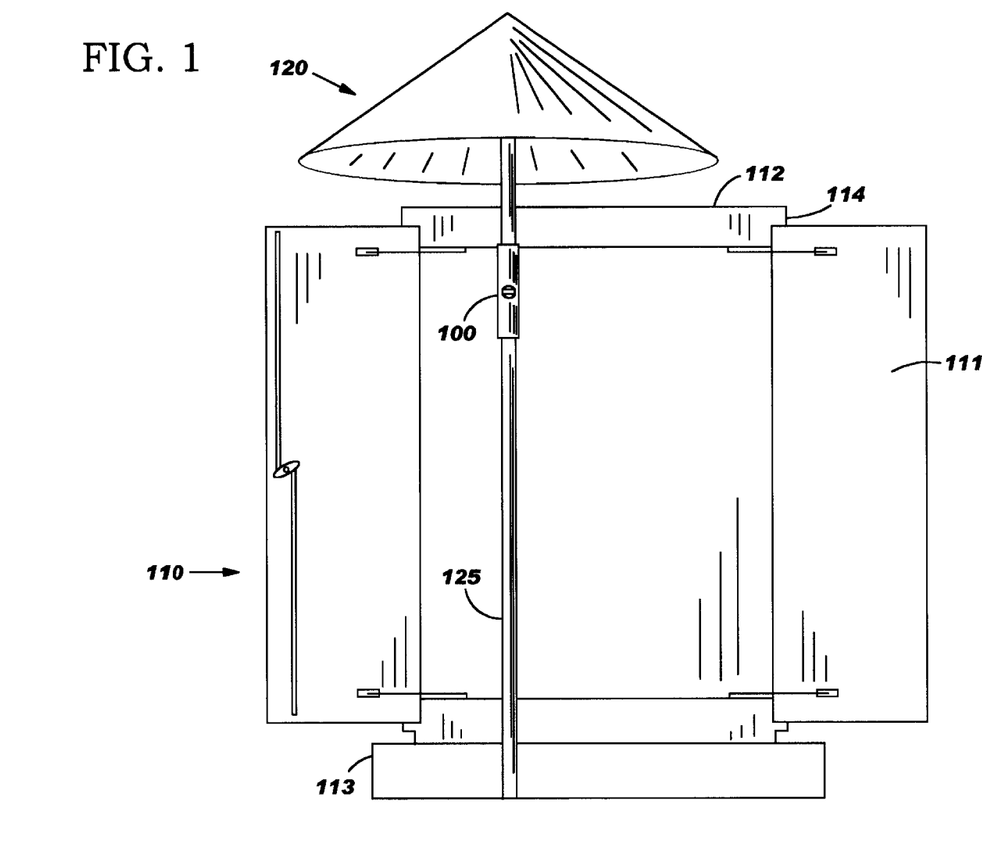
FIG. 1 a perspective front view of a telecommunications cabinet having a portable umbrella holder wedged under a top edge of a telecommunications cabinet according to an embodiment of this invention.
Figure 4:
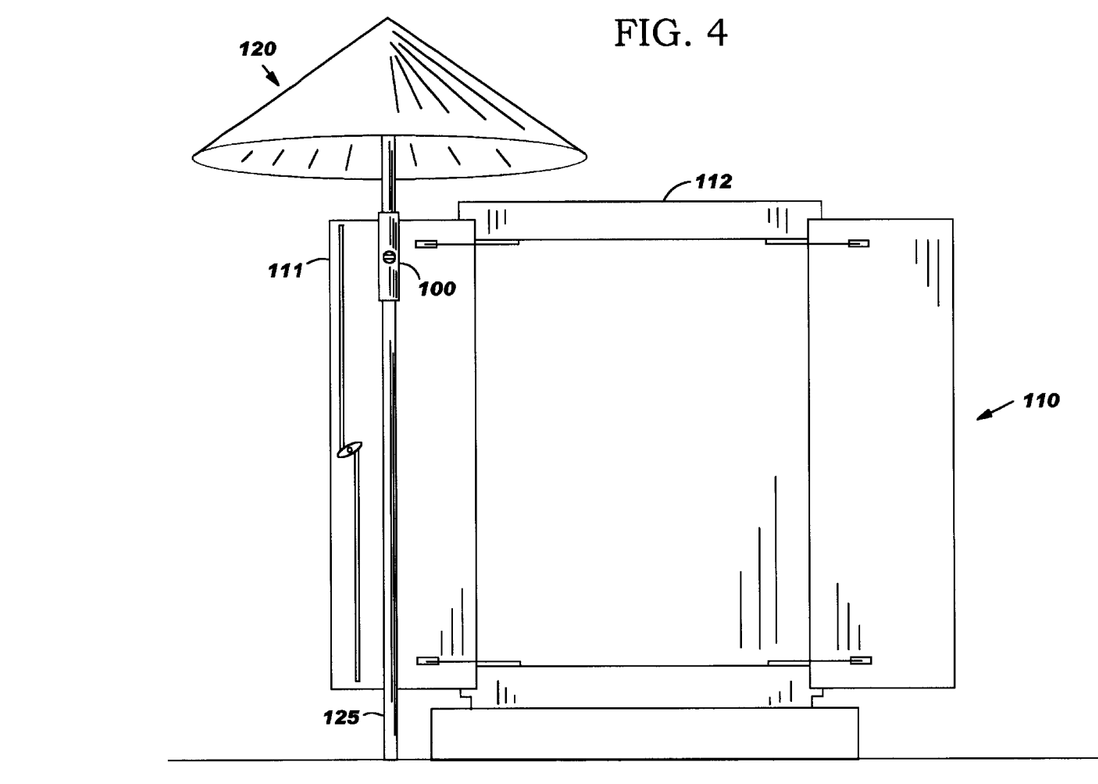
FIG. 4 is a perspective front view of a telecommunications cabinet having a portable umbrella holder engaged over a top portion of an open door of a telecommunications cabinet according to an embodiment of this invention.
Figure 8:
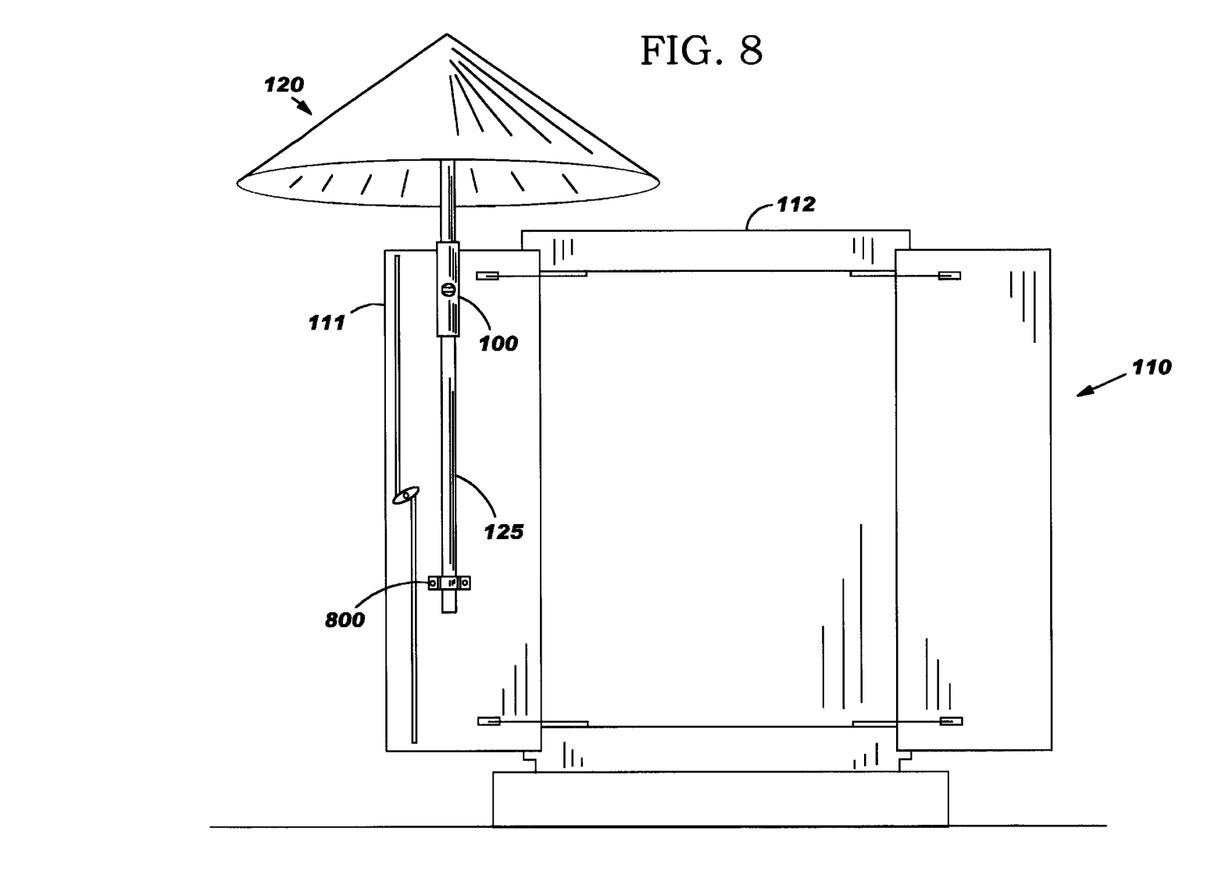
FIG. 8 is a perspective front view of a telecommunications cabinet having a portable umbrella holder engaged over a top portion of an open door of a telecommunications cabinet and having the umbrella pole positioned in a support bracket attached to a lower portion of the open door according to an embodiment of this invention.
Figure 9A:
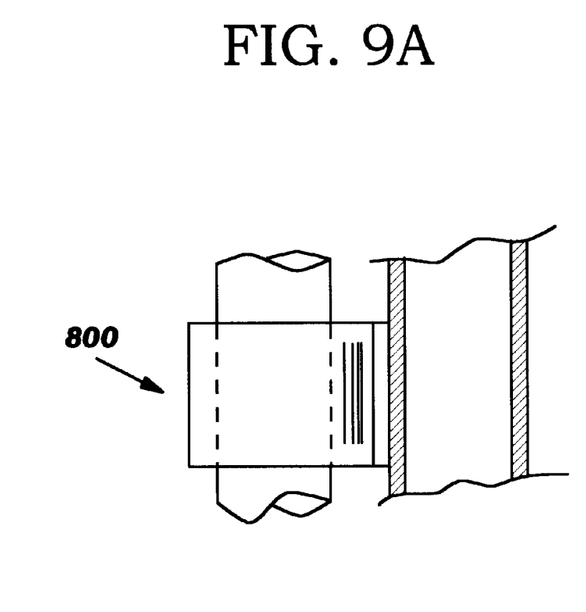
FIG. 9A is a perspective side view of the support bracket of FIG. 8.
Figure 9B:
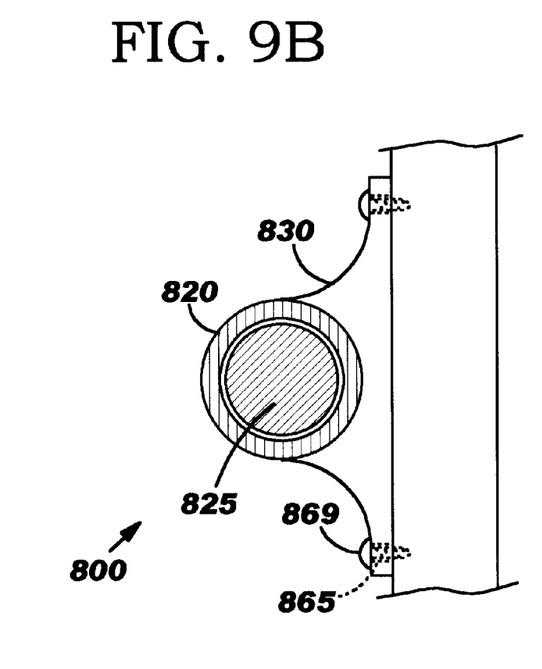
FIG. 9B is a perspective top view of the support bracket of FIG. 8.

As shown by FIGS. 1, 4, and 8, a free-standing item of telecommunications hardware and equipment comprises the cabinet 110 secured to a concrete pad. As depicted, the cabinet 110 has a rectangular or square-shape; however, as one of ordinary skill in the art appreciates, the cabinet 110 may take on a variety of shapes. The umbrella holder 100 may be manufactured using any appropriate material that can withstand a wide range of temperatures, humidity, moisture, and other environmental conditions. For example, the umbrella holder 100 can be formed of G90 galvanized steel having a durable finish coating, such as polyurethane powder. Alternatively, the umbrella holder 100 could be constructed of other appropriate metal, polymer, plastic, ceramic, glass, crystal, and combinations thereof.

The cabinet 110 is provided with at least one access door 111 at its front, a top 112, a bottom portion 113, a pair of side walls 114, and a back wall (not shown). For maintenance and other service purposes, the umbrella holder 100 is provided for positioning an umbrella 120 over the cabinet 110 to cover a work area immediately in front of the at least one door 111. The umbrella holder 100 allows a technician to have hands-free environmental protection over the hardware and equipment when the door 111 is open. The prior art required the technicians themselves to position and support the umbrella while working on the hardware and equipment. The prior art makes it especially difficult in windy and adverse weather conditions for the technician to work with both hands and/or to protect the hardware and equipment.

As shown in FIGS. 1–7, the umbrella holder 100 includes an upwardly extending passageway 605 having a generally cylindrical side wall 250 defining a longitudinal axis, a substantially planar base portion 600 extending along an exterior portion of the passageway, a top 260, and a bottom 270. The umbrella holder 100 further includes a hook (reference numerals 270, 280, and 290) having a shank 270 extending upwardly with the substantially planar base portion 600. The hook further has a handle portion 280 and a backing plate 290 extending downwardly from the handle portion 280. An arm 295 extends upwardly from the handle portion 280. The hook has the appearance of a generally upside down "U"-shaped frame wherein the shank 270 is a first leg, the handle portion 280 is the base, and the backing plate 290 is a second leg. The handle portion 280 and the arm 295 have the appearance of a generally backwards "L"-shaped frame.

Figure 2:
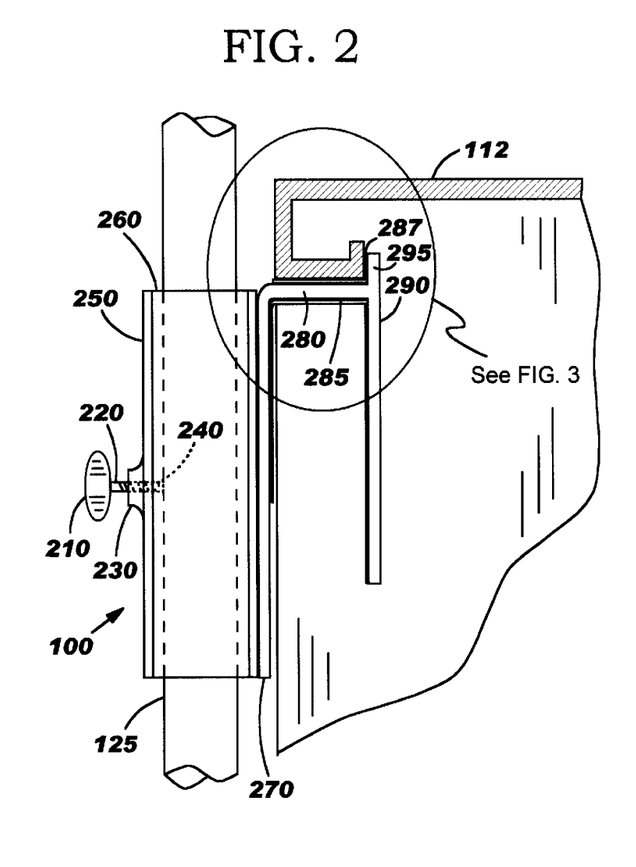
FIG. 2 exploded, perspective side view of the portable umbrella holder wedged under the telecommunications cabinet of FIG. 1.
Figure 10A:
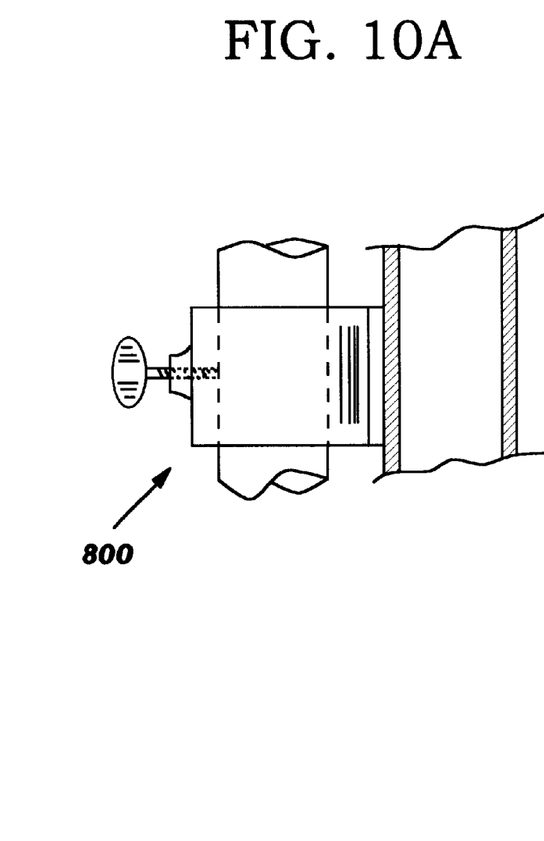
FIGS. 10A–10B are perspective side and top views of the support bracket of FIG. 8 having an additional thumbscrew assembly according to an embodiment of this invention.
Figure 10B:
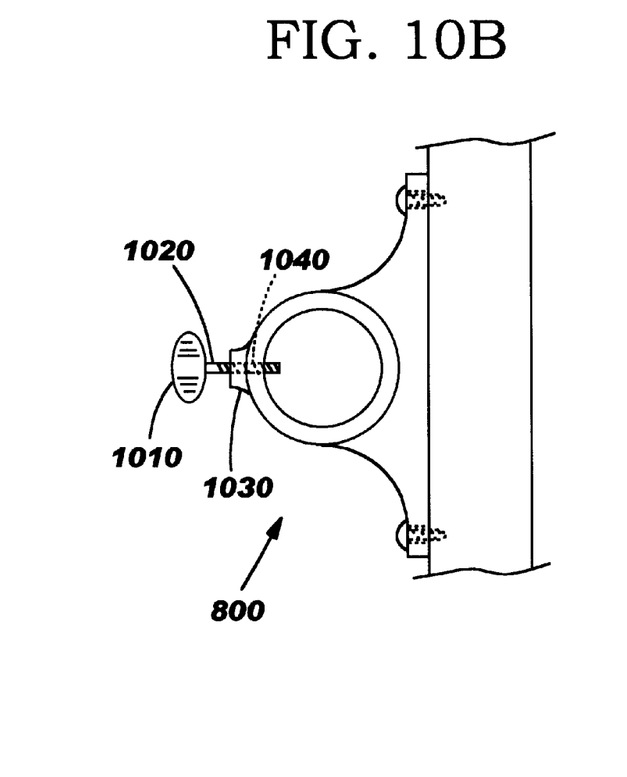
Figure 11A:
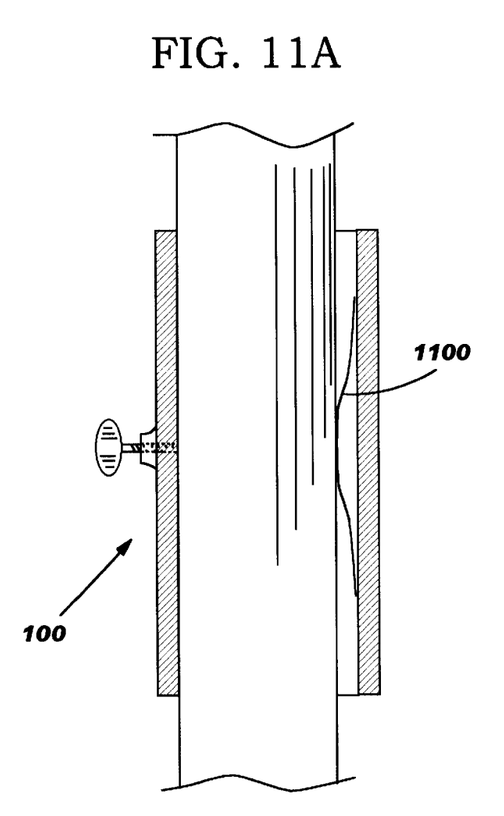
FIGS. 11A–11B are perspective side vies of the umbrella holder of FIG. 2 having alternate means of securing the umbrella in the umbrella holder according to other embodiments of this invention.
Figure 11B:
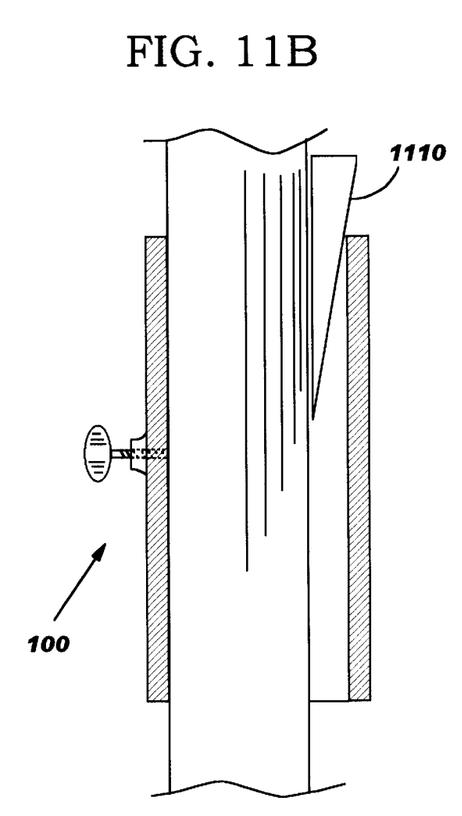

The umbrella holder 100 receives an umbrella. The passageway 605 defines an aperture for receiving a first end of a generally cylindrical section of an umbrella pole (shown as reference numeral 125 in FIGS. 1 and 4). In addition, the umbrella holder 100 includes means for securing the umbrella pole 125 within the passageway 605. As depicted in FIG. 2, the securing means is a thumbscrew assembly that includes a thumbscrew 210, a nut 230, and a threaded passageway 240. The thumbscrew 210 includes a threaded shaft 220 to retain the umbrella pole 125. In FIG. 10B, reference numerals 1010, 1020, 1030 and 1040 are used to show the thumbscrew, threaded shaft, nut and threaded passageway, respectively. As one of ordinary skill in the art appreciates, alternative securing means such as, for example, a friction spring (shown as reference numeral 1100 in FIG. 11A), a wedge (shown as reference numeral 1110 in FIG. 11B), a locking pin assembly, other frictional securing means, and adhesives could be used to secure the umbrella pole 125 to the umbrella holder 100.

Figure 3:
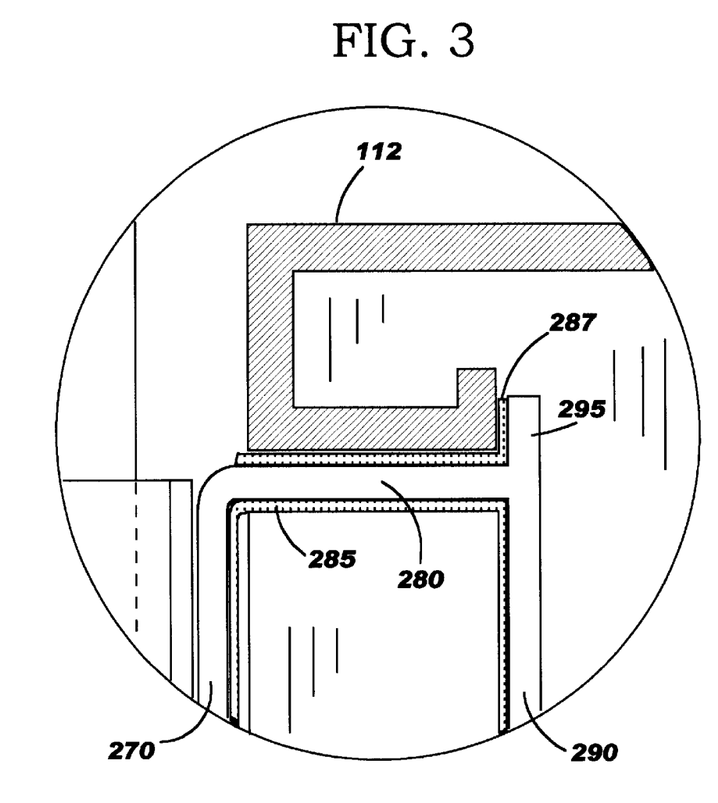
FIG. 3 shows additional detail of the apparatus of FIG. 2.
Figure 5:
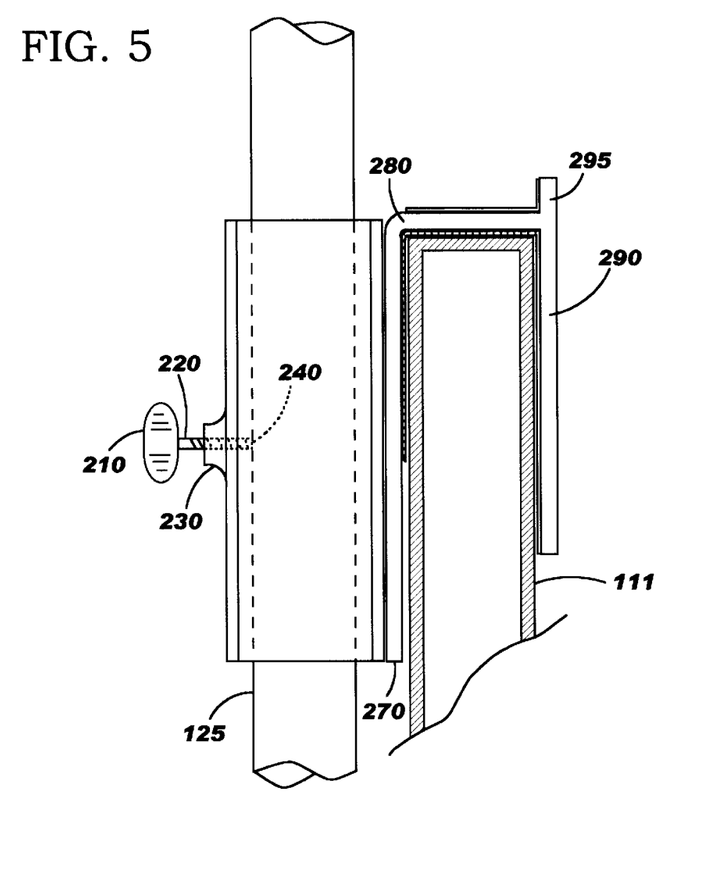
FIG. 5 is a exployed, perspective side view of the portable umbrella holder engaged over the open door the telecommunications cabinet of FIG. 4.
Figure 6:
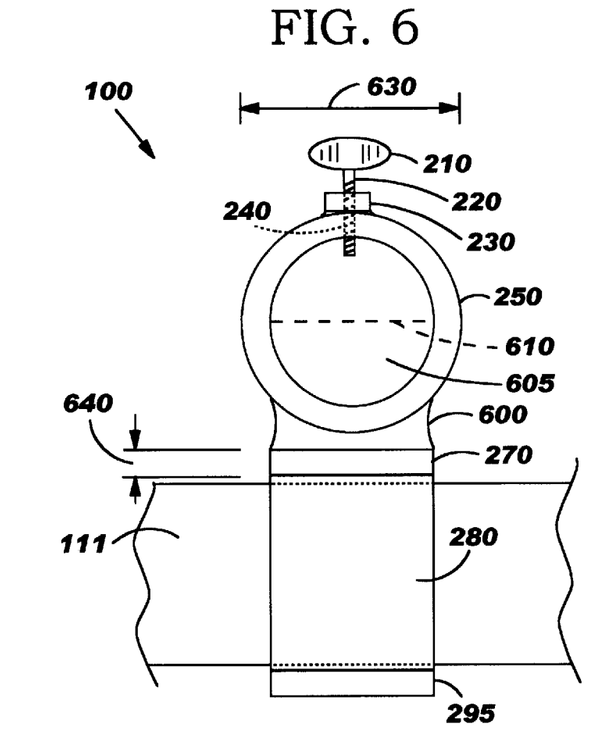
FIG. 6 is a perspective top view of the apparatus of FIG. 4.
Figure 7:
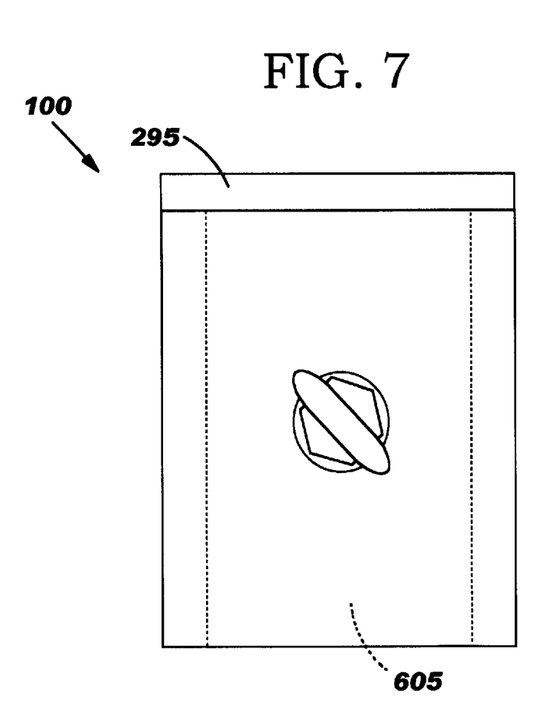
FIG. 7 is a perspective side view of the apparatus of FIG. 4.

As shown in FIGS. 1–3, once the umbrella pole 125 is secured to the umbrella holder 100 at an appropriate height, the umbrella holder 100 may be wedged under a top edge 295 of the cabinet 110 such that the umbrella holder 100 with the umbrella 120 is retained in a desired position. In an embodiment, the umbrella holder 100 may include padding 285 along exterior walls of the shank 270 and/or the arm 295 to protect the top edge of the cabinet 110 and the umbrella holder 100. Alternatively, as shown in FIGS. 4–6, the umbrella holder 100 may engage a top portion of the door 111 such that the umbrella holder 100 with the umbrella is supported by the door to position the umbrella 120. In an embodiment, the umbrella holder 100 may include padding 285 287 along interior walls of the shank 270, the handle portion 280, and/or the backing plate 290 to protect the door 111 and the umbrella holder 100.

In a preferred embodiment, the diameter 610 of the passageway 605 is approximately one and a half (1½) inches, the thickness 640 of the base portion 600 and shank 270 is approximately one-fourth (¼) of an inch, and the length 630 of the cylindrical side wall 250 is approximately two and three-eighths (2⅜) inches. Alternatively, as one of ordinary skill in the art appreciates, these measurements may vary so long as the umbrella holder 100 supports the umbrella 120 in a generally upright position when the umbrella pole 125 is positioned in the umbrella holder 100 and secured to the cabinet 110.

Referring now to FIGS. 8, 9A, 9B, 10A, and 10B, the umbrella holder 100 may also include a companion support bracket 800. The support bracket 800 includes an upwardly extending passageway 825 having a cylindrical side portion 820, a bracket base portion 830, a top (not shown), a bottom (not shown), and means for mounting the bracket base portion 830 to a lower portion of the door 111 of the telecommunications cabinet 110. The support bracket 800 further includes a pair of opposed arms extending outwardly from the base portion 830, opposite the generally cylindrical side portion 820. The pair of arms includes means for fastening the pair of arms to the door 111. As depicted in the FIG. 9B, the fastening means includes holes 865 for screws 869 to fasten into the door 111. As one of ordinary skill in the art appreciates, the means of fastening the support bracket 800 to the door 111 may include a variety of well know elements in the art including screws, nuts, rivets, clamps, adhesive, magnets, welding, and the like. The support bracket 800 is similar in design to an umbrella holder bracket disclosed in applicant's co-pending related application, Ser. No. 10/256,600 entitled "CROSS BOX SIDE MOUNT UMBRELLA BRACKET," filed Sep. 27, 2002, and of which the "Brief Summary of the Invention" and the "Detailed Description of the Invention" sections are incorporated herein by reference.

In addition to the above embodiments, this invention includes the telecommunications cabinet having a plurality of side walls, a top, and at least one door providing access to an interior of the cabinet, the umbrella holder, and/or the support bracket described in the above embodiments. The interior of the cabinet houses hardware and equipment for sending and receiving telecommunications signals or electrical hardware and equipment.

Finally, this invention includes a method of supporting an umbrella that includes positioning the above-described umbrella holder with the umbrella to a telecommunications cabinet. The method may further include positioning a generally cylindrical section of an umbrella pole into the above-described support bracket attached to a lower portion of a door of the telecommunications cabinet. The umbrella holder is positioned either by engaging the hook over a top portion of the door or by securing the umbrella pole within the passageway and wedging the arm under a top edge of the telecommunications cabinet, such that the umbrella holder frictionally retains the umbrella holder with the umbrella in a desired position.

Many modifications and other embodiments of the invention will come to mind to one skilled in the art to which this invention pertains having the benefit of the teachings presented in the foregoing descriptions and the associated drawings. For example, the substantially planar base portion 600 of the umbrella holder 100 may take on alternate shapes, such that they may be curved, flexible, or otherwise designed to extend about a curved surface. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An umbrella holder for a telecommunications cabinet, comprising:
   an upwardly extending passageway having a cylindrical side wall defining a longitudinal axis, the passageway open at a top and a bottom;
   a substantially planar base portion outwardly extending along an exterior portion of the passageway;
   a hook having a shank, a handle portion, and a backing plate, the shank extending upwardly with the substantially planar base portion to the handle portion, and the backing plate extending downwardly from the handle portion; and
   an arm extending upwardly from the handle portion,
   wherein the passageway defines an aperture for receiving an umbrella pole.

2. The umbrella holder of claim 1, further comprising:
   means of securing the umbrella pole within the passageway.

3. The umbrella holder of claim 2, wherein the means of securing the umbrella pole comprises a thumbscrew.

4. The umbrella holder of claim 2, wherein the means of securing the umbrella pole comprises a friction spring.

5. The umbrella holder of claim 2, wherein the means of securing the umbrella pole comprises a wedge.

6. The umbrella holder of claim 1, wherein the shank and the base portion have a thickness of about one-fourth inch.

7. The umbrella holder of claim 1, the passageway having a diameter of about one and a half inches.

8. The umbrella holder of claim 1, the cylindrical side wall having a width of about two and three-eighths inches.

9. The umbrella holder of claim 1, wherein the hook comprises a generally upside down U-shaped top portion having the shank as a first leg, the handle portion as a base, and the backing plate as a second leg such that the hook engages a top portion of the door of the telecommunications cabinet.

10. The umbrella holder of claim 9, wherein the handle portion and the arm extending upwardly from the handle portion comprises a generally backwards L-shape such that the handle portion and arm frictionally retain the umbrella holder under a top edge of the telecommunications cabinet.

11. The umbrella holder of claim 1, further comprising:
a support bracket, the support bracket having an upwardly extending passageway having a cylindrical side portion, a bracket base portion, a top, and a bottom; and
means for mounting the bracket base portion to a door of the telecommunications cabinet,
wherein the passageway in the support bracket defines a second aperture for positioning the umbrella pole.

12. The umbrella holder of claim 11, wherein the means for mounting the bracket base portion to the door comprises at least one of the following:
a nut;
a bolt;
a screw;
a rivet; and
welding.

13. The umbrella holder of claim 11, wherein the means for mounting the bracket base portion to the door of the telecommunications cabinet comprises a pair of opposed arms extending outwardly from the bracket base portion.

14. The umbrella holder of claim 13, wherein the pair of arms and the bracket base portion have a thickness of about one-fourth inch.

15. The umbrella holder of claim 13, wherein the means for mounting the bracket base portion to the door of the telecommunications cabinet further comprises means for fastening the pair of arms to the door.

16. The umbrella holder of claim 15, wherein the means fastening the pair of arms to the door comprises at least one of the following:
a nut;
a bolt;
a screw;
a rivet; and
welding.

17. The umbrella holder of claim 1, further comprising:
padding means for protecting a surface of the hook.

18. A method of supporting an umbrella, comprising:
positioning an umbrella holder with the umbrella to a telecommunications cabinet, the umbrella holder comprising:
an upwardly extending passageway having a cylindrical side wall defining a longitudinal axis, the passageway open at a top and a bottom,
a substantially planar base portion outwardly extending along an exterior portion of the passageway,
a hook having a shank, a handle portion, and a backing plate, the shank extending upwardly with the substantially planar base portion to the handle portion, and the backing plate extending downwardly from the handle portion, and
an arm extending upwardly from the handle portion, wherein the passageway defines an aperture for receiving an umbrella pole.

19. The method of claim 18, wherein positioning the umbrella holder with the umbrella to a telecommunications cabinet further comprises:
engaging the hook over a top portion of a door of the telecommunications cabinet.

20. The method of claim 18, wherein positioning the umbrella holder with the umbrella to a telecommunications cabinet further comprises:
securing the umbrella pole within the passageway; and
wedging the arm under a top edge of the telecommunications cabinet,
such that the umbrella holder frictionally retains the umbrella holder with the umbrella in a desired position.

21. A telecommunications cabinet, comprising:
a plurality of side walls, a top, and at least one door providing access to an interior of the cabinet, wherein the interior of the cabinet houses hardware and equipment for sending and receiving telecommunications signals;
an umbrella holder comprising:
an upwardly extending passageway having a cylindrical side wall defining a longitudinal axis, the passageway open at a top and a bottom,
a substantially planar base portion outwardly extending along an exterior portion of the passageway,
a hook having a shank, a handle portion, and a backing plate, the shank extending upwardly with the substantially planar base portion to the handle portion, and the backing plate extending downwardly from the handle portion, and
an arm extending upwardly from the handle portion, wherein the passageway defines an aperture for receiving an umbrella pole;
means of securing the umbrella pole within the passageway;
a support bracket, the support bracket having an upwardly extending passageway having a cylindrical side portion, a bracket base portion, a top, and a bottom; and
means for mounting the bracket base portion to a door of the telecommunications cabinet, wherein the passageway in the support bracket defines a second aperture for positioning the umbrella pole.

* * * * *